US012616939B2

(12) United States Patent
Herrington et al.

(10) Patent No.: US 12,616,939 B2
(45) Date of Patent: May 5, 2026

(54) VARIABLE VELOCITY PATTERNS IN CROSS-FLOW FILTRATION

(71) Applicant: Aqua Membranes, Inc., Albuquerque, NM (US)

(72) Inventors: Rodney E Herrington, Albuquerque, NM (US); Kevin Roderick, Albuquerque, NM (US); Stephen Aulbach, Cedar Crest, NM (US); Jay Kendall Weingardt, Albuquerque, NM (US); Jay Collin Weingardt, Albuquerque, NM (US); Nelson Longmire, Albuquerque, NM (US)

(73) Assignee: Aqua Membranes, Inc., Albuquerque, NM (US)

( * ) Notice: Subject to any disclaimer, the term of this patent is extended or adjusted under 35 U.S.C. 154(b) by 634 days.

(21) Appl. No.: 18/004,668

(22) PCT Filed: Jul. 2, 2021

(86) PCT No.: PCT/US2021/040353
§ 371 (c)(1),
(2) Date: Jan. 7, 2023

(87) PCT Pub. No.: WO2022/015525
PCT Pub. Date: Jan. 20, 2022

(65) Prior Publication Data
US 2023/0241556 A1 Aug. 3, 2023

Related U.S. Application Data

(60) Provisional application No. 63/051,738, filed on Jul. 14, 2020.

(51) Int. Cl.
*B01D 63/10* (2006.01)

(52) U.S. Cl.
CPC ...... *B01D 63/103* (2013.01); *B01D 2313/143* (2013.01)

(58) Field of Classification Search
CPC .......... B01D 2313/14; B01D 2313/143; B01D 2313/08; B01D 63/103; B01D 63/10; B01D 2313/086; B01D 2321/2016; B01D 2321/2008
See application file for complete search history.

(56) References Cited

U.S. PATENT DOCUMENTS

| | | | |
|---|---|---|---|
| 2,518,285 | A | 8/1950 | Coleman |
| 2,889,932 | A | 6/1959 | Mackintosh |
| 3,962,096 | A | 6/1976 | Ishii |
| 3,963,621 | A | 6/1976 | Newman |
| 4,053,417 | A | 10/1977 | Newman |
| 4,187,173 | A | 2/1980 | Keefer |
| 4,208,289 | A | 6/1980 | Bray |
| 4,222,874 | A | 9/1980 | Connelly |

(Continued)

FOREIGN PATENT DOCUMENTS

| | | |
|---|---|---|
| CA | 1214114 | 12/1981 |
| CA | 2034706 | 7/1991 |

(Continued)

*Primary Examiner* — Pranav N Patel
(74) *Attorney, Agent, or Firm* — V Gerald Grafe

(57) ABSTRACT

Embodiments of the present invention provide methods and apparatuses that can alter flow characteristics within the feed channel of a cross-flow filtration element by employing a varying geometry of the feed spacer at a fixed channel height.

5 Claims, 9 Drawing Sheets

100

(56)                   References Cited

U.S. PATENT DOCUMENTS

| | | |
|---|---|---|
| 4,228,014 A | 10/1980 | Timm et al. |
| 4,230,564 A | 10/1980 | Keefer |
| 4,230,579 A | 10/1980 | Bray et al. |
| 4,235,723 A | 11/1980 | Bartlett, Jr. |
| 4,277,340 A | 7/1981 | Kanamaru et al. |
| 4,288,326 A | 9/1981 | Keefer |
| 4,309,287 A | 1/1982 | Roos et al. |
| 4,326,960 A | 4/1982 | Iwahori et al. |
| 4,341,631 A | 7/1982 | Hargitay |
| 4,347,132 A | 8/1982 | Davis |
| 4,354,939 A | 10/1982 | Pohl |
| 4,358,377 A | 11/1982 | Clark |
| 4,409,849 A | 10/1983 | Roos |
| 4,410,429 A | 10/1983 | Harvey et al. |
| 4,411,785 A | 10/1983 | Yu et al. |
| 4,426,285 A | 1/1984 | Davis |
| 4,434,056 A | 2/1984 | Keefer |
| 4,454,891 A | 6/1984 | Dreibelbis et al. |
| 4,461,707 A | 7/1984 | Thayer et al. |
| 4,476,022 A | 10/1984 | Doll |
| 4,482,459 A | 11/1984 | Shiver |
| 4,534,713 A | 8/1985 | Wanner |
| 4,556,488 A | 12/1985 | Timm et al. |
| 4,585,554 A | 4/1986 | Burrows |
| RE32,144 E | 5/1986 | Keefer |
| 4,595,497 A | 6/1986 | Burrows |
| 4,599,171 A | 7/1986 | Padilla et al. |
| 4,600,512 A | 7/1986 | Aid |
| 4,608,140 A | 8/1986 | Goldstein |
| 4,613,436 A | 9/1986 | Wight et al. |
| 4,623,451 A | 11/1986 | Oliver |
| 4,623,467 A | 11/1986 | Hamlin |
| 4,640,774 A | 2/1987 | Garcera et al. |
| 4,645,601 A | 2/1987 | Regunathan et al. |
| 4,652,373 A | 3/1987 | Trimmer |
| 4,657,674 A | 4/1987 | Burrows |
| 4,670,144 A | 6/1987 | McCausland et al. |
| 4,695,375 A | 9/1987 | Tyler |
| 4,704,324 A | 11/1987 | Davis et al. |
| 4,705,625 A | 11/1987 | Hart, Jr. |
| 4,735,716 A | 4/1988 | Petrucci et al. |
| 4,735,718 A | 4/1988 | Peters |
| 4,741,823 A | 5/1988 | Olsen et al. |
| 4,743,366 A | 5/1988 | Burrows |
| 4,744,895 A | 5/1988 | Gales et al. |
| 4,744,900 A | 5/1988 | Bratt |
| 4,756,835 A | 7/1988 | Wilson |
| 4,775,465 A | 10/1988 | Burrows |
| 4,781,831 A | 11/1988 | Goldsmith |
| 4,784,771 A | 11/1988 | Wathen et al. |
| 4,802,982 A | 2/1989 | Lien |
| 4,814,079 A | 3/1989 | Schneider |
| 4,820,413 A | 4/1989 | Lopez |
| 4,830,744 A | 5/1989 | Burrows |
| 4,832,850 A | 5/1989 | Cais et al. |
| 4,834,873 A | 5/1989 | Burrows |
| 4,834,881 A | 5/1989 | Sawada |
| 4,842,725 A | 6/1989 | Blad et al. |
| 4,844,805 A | 7/1989 | Solomon |
| 4,855,058 A | 8/1989 | Holland et al. |
| 4,856,559 A | 8/1989 | Lipshultz et al. |
| 4,861,487 A | 8/1989 | Fulk |
| 4,869,821 A | 9/1989 | Korin |
| 4,874,514 A | 10/1989 | Casey Jr. |
| 4,876,002 A | 10/1989 | Marshall et al. |
| 4,877,521 A | 10/1989 | Petrucci et al. |
| 4,882,061 A | 11/1989 | Petrucci et al. |
| 4,882,223 A | 11/1989 | Aptel et al. |
| RE33,135 E | 12/1989 | Wanner, Sr. et al. |
| 4,885,092 A | 12/1989 | Zwick |
| 4,886,597 A | 12/1989 | Wild et al. |
| 4,892,657 A | 1/1990 | Mohn et al. |
| 4,902,417 A | 2/1990 | Lien |
| 4,906,372 A | 3/1990 | Hopkins |
| 4,917,847 A | 4/1990 | Solomon |
| 4,937,557 A | 6/1990 | Tucci et al. |
| 4,944,877 A | 7/1990 | Maples |
| 4,988,525 A | 1/1991 | Gresch |
| 4,990,248 A | 2/1991 | Brown et al. |
| 4,992,170 A | 2/1991 | Menon et al. |
| 4,995,977 A | 2/1991 | Hilgendorff et al. |
| 5,002,664 A | 3/1991 | Clack et al. |
| 5,017,284 A | 5/1991 | Miler et al. |
| 5,043,066 A | 8/1991 | Miller et al. |
| 5,045,197 A | 9/1991 | Burrows |
| 5,057,212 A | 10/1991 | Burrows |
| 5,069,789 A | 12/1991 | Mohn et al. |
| 5,078,876 A | 1/1992 | Whittier et al. |
| 5,094,749 A | 3/1992 | Seita et al. |
| 5,096,574 A | 3/1992 | Birdsong et al. |
| 5,096,584 A | 3/1992 | Reddy |
| 5,104,532 A | 4/1992 | Thompson et al. |
| 5,108,604 A | 4/1992 | Robbins |
| 5,114,582 A | 5/1992 | Sandstrom |
| 5,128,035 A | 7/1992 | Clack et al. |
| 5,131,277 A | 7/1992 | Birdsong et al. |
| 5,132,017 A | 7/1992 | Birdsong et al. |
| 5,145,575 A | 9/1992 | Burrows |
| 5,167,786 A | 12/1992 | Eberle |
| 5,167,826 A | 12/1992 | Eaton |
| 5,183,567 A | 2/1993 | Mohn et al. |
| 5,194,156 A | 3/1993 | Tomchak |
| 5,198,110 A | 3/1993 | Hanai et al. |
| 5,204,002 A | 4/1993 | Belfort et al. |
| 5,232,591 A | 8/1993 | Solomon |
| 5,234,583 A | 8/1993 | Cluff |
| 5,240,612 A | 8/1993 | Grangeon et al. |
| 5,275,726 A | 1/1994 | Feimer |
| 5,279,732 A | 1/1994 | Edens |
| 5,296,148 A | 3/1994 | Colangelo et al. |
| 5,354,464 A | 10/1994 | Slovak et al. |
| 5,362,383 A | 11/1994 | Zimmerman et al. |
| 5,462,414 A | 10/1995 | Permar |
| 5,466,366 A | 11/1995 | Chia-ching |
| 5,468,387 A | 11/1995 | Solomon |
| 5,507,943 A | 4/1996 | Labrador |
| RE35,252 E | 5/1996 | Clack et al. |
| 5,545,320 A | 8/1996 | Heine et al. |
| 5,573,662 A | 11/1996 | Abe et al. |
| 5,597,487 A | 1/1997 | Vogel et al. |
| 5,626,752 A | 5/1997 | Mohn et al. |
| 5,626,758 A | 5/1997 | Belfort |
| 5,628,198 A | 5/1997 | Permar |
| 5,681,459 A | 10/1997 | Bowman |
| 5,681,467 A | 10/1997 | Solie et al. |
| 5,788,858 A | 8/1998 | Acernese et al. |
| 5,795,475 A | 8/1998 | Luedke et al. |
| 5,811,251 A | 9/1998 | Hirose et al. |
| 5,824,217 A | 10/1998 | Pearl et al. |
| 5,914,041 A | 6/1999 | Chancellor |
| 5,944,985 A | 8/1999 | Bowman |
| 5,985,146 A | 11/1999 | Knappe et al. |
| 6,030,535 A | 2/2000 | Hayashi et al. |
| 6,071,404 A | 6/2000 | Tsui |
| 6,071,414 A | 6/2000 | Kishi |
| 6,099,735 A | 8/2000 | Kelada |
| 6,109,029 A | 8/2000 | Vowles et al. |
| 6,110,360 A | 8/2000 | Hart, Jr. |
| 6,117,297 A | 9/2000 | Goldstein |
| 6,120,682 A | 9/2000 | Cook |
| 6,126,833 A | 10/2000 | Stobbe et al. |
| 6,174,437 B1 | 1/2001 | Haney |
| 6,190,557 B1 | 2/2001 | Hisada et al. |
| 6,193,879 B1 | 2/2001 | Bowman |
| 6,197,191 B1 | 3/2001 | Wobben |
| 6,217,773 B1 | 4/2001 | Graham |
| 6,258,270 B1 | 7/2001 | Hilgendorff et al. |
| 6,277,282 B1 | 8/2001 | Kihara et al. |
| 6,299,766 B1 | 10/2001 | Permar |
| 6,345,961 B1 | 2/2002 | Oklejas, Jr. |
| 6,348,148 B1 | 2/2002 | Bosley |
| 6,379,518 B1 | 4/2002 | Osawa et al. |
| 6,379,548 B1 | 4/2002 | Kurokawa et al. |
| 6,383,384 B1 | 5/2002 | Anderson |

(56) References Cited

U.S. PATENT DOCUMENTS

| | | | |
|---|---|---|---|
| RE37,759 E | 6/2002 | Belfort |
| 6,402,956 B1 | 6/2002 | Andou et al. |
| 6,423,212 B1 | 7/2002 | Bosko |
| 6,423,223 B1 | 7/2002 | Northcut et al. |
| 6,432,301 B1 | 8/2002 | Dengler |
| 6,436,282 B1 | 8/2002 | Gundrum et al. |
| 6,447,259 B2 | 9/2002 | Elliott-Moore |
| 6,514,398 B2 | 2/2003 | DiMascio et al. |
| 6,521,124 B2 | 2/2003 | Northcut et al. |
| 6,521,127 B1 | 2/2003 | Chancellor |
| 6,524,478 B1 | 2/2003 | Heine et al. |
| 6,540,915 B2 | 4/2003 | Patil |
| 6,575,308 B1 | 6/2003 | Fuls et al. |
| 6,579,451 B1 | 6/2003 | Avero |
| 6,607,668 B2 | 8/2003 | Rela |
| 6,613,231 B1 | 9/2003 | Jitariouk |
| 6,632,357 B1 | 10/2003 | Barger et al. |
| 6,790,345 B2 | 9/2004 | Broussard |
| 6,805,796 B2 | 10/2004 | Hirose et al. |
| 6,830,683 B2 | 12/2004 | Gundrum et al. |
| 6,866,831 B2 | 3/2005 | Nakao et al. |
| 6,929,743 B2 | 8/2005 | Diel |
| 6,929,748 B2 | 8/2005 | Avijit et al. |
| 7,021,667 B2 | 4/2006 | Campbell et al. |
| 7,186,331 B2 | 3/2007 | Maartens et al. |
| 7,244,357 B2 | 7/2007 | Herrington et al. |
| 7,297,268 B2 | 11/2007 | Herrington et al. |
| 7,306,437 B2 | 12/2007 | Hauge |
| 7,311,831 B2 | 12/2007 | Bradford et al. |
| 7,351,335 B2 | 4/2008 | Broens et al. |
| 7,387,725 B2 | 6/2008 | Choi et al. |
| 7,416,666 B2 | 8/2008 | Gordon |
| 7,449,093 B2 | 11/2008 | Dudziak et al. |
| 7,455,778 B2 | 11/2008 | Gordon |
| 7,470,639 B2 | 12/2008 | Angelini |
| 7,501,064 B2 | 3/2009 | Schmidt et al. |
| 7,514,010 B2 | 4/2009 | Salmon |
| 7,520,981 B2 | 4/2009 | Barber |
| 7,540,956 B1 | 6/2009 | Kurth et al. |
| 7,650,805 B2 | 1/2010 | Nauseda et al. |
| 7,733,459 B2 | 6/2010 | Dierichs et al. |
| 7,736,503 B2 | 6/2010 | Kennedy et al. |
| 7,862,723 B2 | 1/2011 | Cartwright |
| 7,875,184 B2 | 1/2011 | Parker et al. |
| 7,892,429 B2 | 2/2011 | Oklejas, Jr. |
| 7,901,580 B2 | 3/2011 | Salyer |
| 7,909,998 B2 | 3/2011 | Kennedy et al. |
| 7,910,004 B2 | 3/2011 | Cohen et al. |
| 7,927,082 B2 | 4/2011 | Haudenschild |
| 7,981,293 B2 | 7/2011 | Powell |
| 8,021,550 B2 | 9/2011 | Beauchamp et al. |
| 8,101,074 B2 | 1/2012 | Larsen |
| 8,114,286 B2 | 2/2012 | Kawakami |
| 8,147,699 B2 | 4/2012 | Goldsmith |
| 8,257,594 B2 | 9/2012 | Astle et al. |
| 8,282,823 B2 | 10/2012 | Acernese et al. |
| 8,292,088 B2 | 10/2012 | Francisco et al. |
| 8,292,492 B2 | 10/2012 | Ho et al. |
| 8,414,767 B2 | 4/2013 | Gaignet et al. |
| 8,425,734 B2 | 4/2013 | Goel et al. |
| 8,454,829 B2 | 6/2013 | Yaeger |
| 8,506,685 B2 | 8/2013 | Taylor et al. |
| 8,518,225 B2 | 8/2013 | Sumita et al. |
| 8,628,642 B2 | 1/2014 | Goel et al. |
| 8,652,326 B2 | 2/2014 | Johann et al. |
| 8,685,252 B2 | 4/2014 | Vuong et al. |
| 8,696,904 B2 | 4/2014 | Thiyagarajan et al. |
| 8,771,510 B2 | 7/2014 | Takahashi et al. |
| 8,778,055 B2 | 7/2014 | Taylor et al. |
| 8,808,538 B2 | 8/2014 | Oklejas, Jr. |
| 8,889,009 B2 | 11/2014 | Brausch et al. |
| 8,944,257 B2 | 2/2015 | Eisen et al. |
| 8,961,790 B2 | 2/2015 | Beauchamp et al. |
| 8,968,566 B2 | 3/2015 | Beauchamp et al. |
| 8,999,162 B2 | 4/2015 | Vuong et al. |
| 9,011,664 B2 | 4/2015 | Takahashi et al. |
| 9,011,688 B2 | 4/2015 | Takahashi et al. |
| 9,108,162 B2 | 8/2015 | Takahashi et al. |
| 9,114,365 B2 | 8/2015 | Schmitt |
| 9,260,325 B2 | 2/2016 | Takahashi et al. |
| 9,328,743 B2 | 5/2016 | Hirosawa et al. |
| 9,387,445 B2 | 7/2016 | Kimura et al. |
| 9,403,125 B2 | 8/2016 | Shaffer |
| 9,475,008 B2 | 10/2016 | Salama et al. |
| 9,492,792 B2 | 11/2016 | Tomescu et al. |
| 9,546,671 B2 | 1/2017 | Hirosawa et al. |
| 9,597,640 B2 | 3/2017 | Koiwa et al. |
| 9,616,390 B2 | 4/2017 | Hirozawa et al. |
| 9,617,172 B1 | 4/2017 | Baski |
| 9,724,646 B2 | 8/2017 | Okamoto et al. |
| 9,731,984 B2 | 8/2017 | Beall |
| 9,758,389 B2 | 9/2017 | Rau, III |
| 9,764,291 B2 | 9/2017 | Hirozawa et al. |
| 2004/0045892 A1 | 3/2004 | De La Cruz |
| 2006/0011544 A1 | 1/2006 | Sharma |
| 2006/0191837 A1 | 8/2006 | Heiner |
| 2007/0095756 A1 | 5/2007 | Hardwicke |
| 2011/0232061 A1 | 9/2011 | Jons |
| 2013/0334128 A1 | 12/2013 | Takagi |
| 2016/0008763 A1 | 1/2016 | Roderick et al. |
| 2019/0030488 A1 | 1/2019 | Roderick |

FOREIGN PATENT DOCUMENTS

| | | | |
|---|---|---|---|
| CA | 2662925 A1 | 1/2009 |
| CA | 2825674 C | 8/2011 |
| EP | 0443642 | 1/1990 |
| JP | 57-059611 A | 10/1982 |
| JP | 58-104604 A | 6/1983 |
| JP | 2004-050081 | 7/2002 |
| JP | 2006247453 | 9/2006 |
| JP | 2012-045540 | 7/2010 |
| WO | WO2010047360 A1 | 4/2010 |
| WO | WO2015016253 A1 | 2/2015 |
| WO | WO2017087461 A1 | 5/2017 |
| WO | WO2018094288 | 5/2018 |
| WO | WO2018190937 | 10/2018 |
| WO | WO2018194911 | 10/2018 |
| WO | WO2018195367 | 10/2018 |

100

200

VARIABLE VELOCITY PATTERNS IN CROSS-FLOW FILTRATION

TECHNICAL FIELD

The subject invention relates to a membrane system utilized for the separation of fluid components, specifically cross-flow and spiral-wound membrane elements.

BACKGROUND ART

In cross-flow filtration, a feed fluid flows through a filter and is released at the other end, while some portion of the fluid is removed by filtration through a membrane surface which is parallel to the direction of fluid flow. Various forms of cross-flow filtration exist including plate-and-frame, cassette, hollow-fiber, or spiral wound systems. Plate-and-frame, cassette, and spiral-wound filtration modules often rely on stacked membrane layers which provide spacing between adjacent layers of filtration membrane and the present invention is applicable to such systems.

Spiral-wound membrane filtration elements are known in the art and comprise a laminated structure having of a membrane sheet sealed to or around a porous permeate carrier which creates a path for removal, longitudinally to the axis of the center tube, of the fluid passing through the membrane to a central tube, while this laminated structure is wrapped spirally around the central tube and spaced from itself with a porous feed spacer to allow axial flow of the fluid through the element. Traditionally, a feed spacer is used to allow flow of the feed water, some portion of which will pass through the membrane, into the spiral wound element and allow reject water to exit the element in a direction parallel to the center tube and axial to the element construction.

Improvements to the design of spiral wound elements have been disclosed in U.S. Pat. No. 6,632,357 to Barger et al, U.S. Pat. No. 7,311,831 to Bradford et al, and patents in Australia (2014223490) and Japan (6499089) entitled "Improved Spiral Wound Element Construction" to Herrington et al which replaces the feed spacer with islands or protrusions either printed, deposited or embossed directly onto the inside or outside surface of the membrane. US patent application PCT/WO2018190937A1 entitled "Graded spacers for filtration wound elements" to Roderick, et al, describe the use of height graded spacer features which are used to alter feed flow characteristics in a spiral wound element.

DESCRIPTION OF INVENTION

Embodiments of the present invention provide methods and apparatuses that can alter flow characteristics within the feed channel of a cross-flow filtration element by employing a varying geometry of the feed spacer at a fixed channel height.

MODES FOR CARRYING OUT THE INVENTION AND INDUSTRIAL APPLICABILITY

Figure 1:
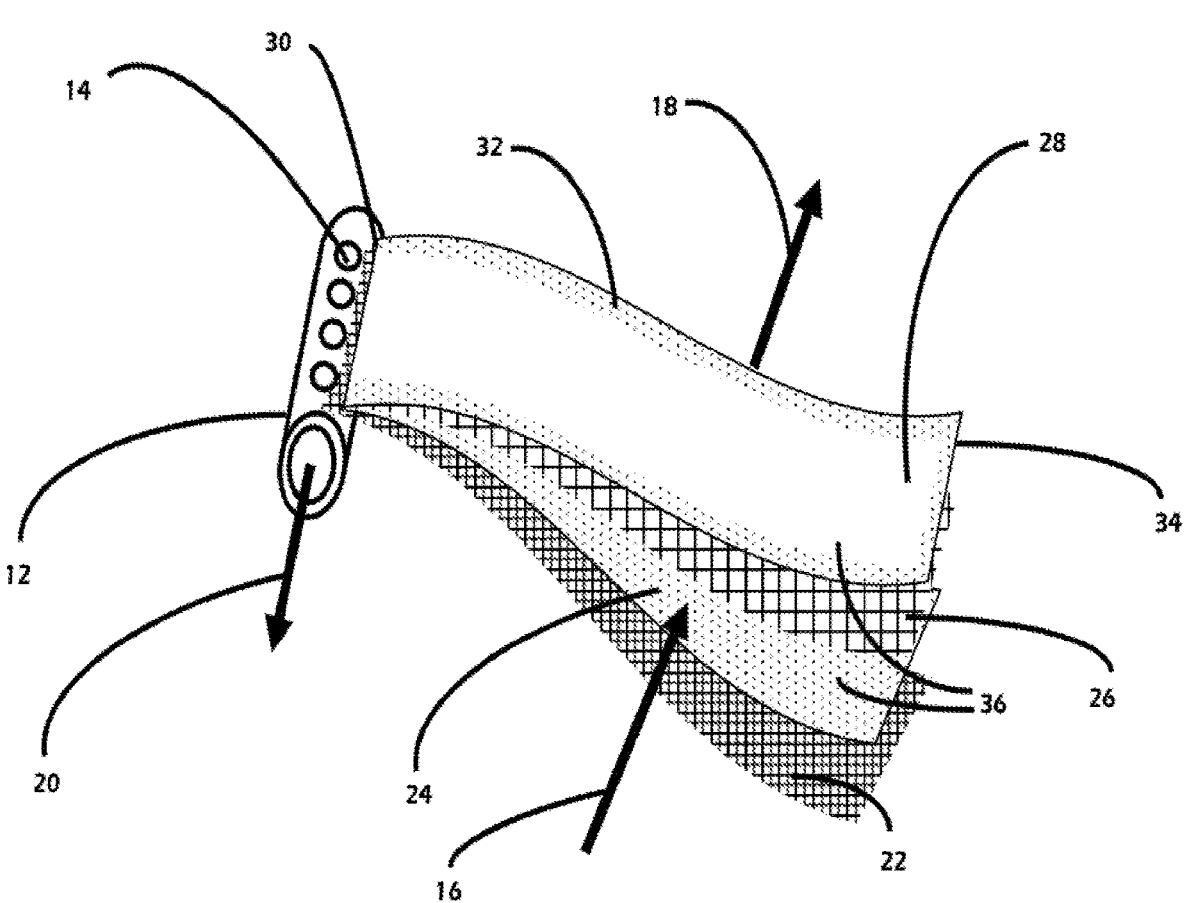
FIG. 1 is an exploded view of a spiral wound membrane element.

The feed spacer in a spiral wound filtration element is required to maintain a channel for feed fluid to flow through, but the spacer design also impacts local flow velocities, turbulence, stagnation zones and other fluid flow conditions. Extruded mesh feed spacers have been used traditionally in membrane manufacture due to their ease of integration in the production process, but by the nature of their design many of their hydrodynamic characteristics are dependent on the thickness of the spacer. Printed feed spacers allow for unique design characteristics unobtainable with conventional extruded or woven mesh spacers, since their thickness and geometry can be changed independently to yield a wide range of configurations which can be tailored to specific applications or specific challenges found in spiral wound membrane element construction.

Cross-flow filtration, by its nature, relies on some portion of the feed fluid to pass through the filter and become part of the filtrate, thus creating a situation where the quantity of the feed fluid is constantly being reduced as it passes through the filter. The higher the portion of filtrate produced, the lower the portion of feed/concentrate fluid that remains flowing through the filter. As a fluid flows through the element, a portion of the fluid passes through the membrane. Modeled simply, a constant flux through the membrane produces a gradually decreasing flow of the feed solution as it flows through the element. In reality the amount of fluid passing through depends on local flow conditions and local concentrations of solutes or suspended materials, as well as the local pressure which also depends on any back-pressure from the permeate side of the element locally.

Many cross-flow filtration systems, such as spiral wound elements and stack filters, rely on parallel flat sheets of membrane material through which the feed fluid flows. In such systems where the feed channel occupies a fixed volume, the loss of feed fluid to the filtrate stream creates a situation where the fluid stream flowing from the feed inlet to the concentrate outlet decreases in cross-flow velocity along the length of the filter. Hydrodynamic conditions in the filter, including the cross-flow velocity, as well as the filter geometry and the feed spacer, affect several important characteristics of the fluid flow such as fluid shear, boundary layer thickness, and concentration polarization which in turn affect filter performance characteristics including membrane flux, frictional pressure losses, biological fouling, and scaling. Thus, for a system with a fixed filter geometry and feed spacer, the changing cross-flow velocity induces changes in these characteristics throughout the system, which can limit performance.

One approach to account for this is to change the geometry of the system. By reducing the feed spacer height in the direction of the cross-flow, while keeping other aspects of the feed space identical, a more constant feed velocity can be achieved. Such a system has been described in PCT patent application WO2018190937A1, GRADED SPACERS IN SPIRAL WOUND ELEMENTS. Another approach to control cross-flow velocity is to maintain the same geometry within the feed space, but to alter the feed spacer, which serves to separate the membrane sheets from one another, in such a way as to change the average velocity in within the feed space. The present invention provides methods and apparatuses that can control the flow velocity within a feed channel by employing a feed spacer whose spatial density changes in order to alter flow characteristics in various regions within the element.

Feed spacing features employed can be of any of a number of shapes, including round dots, ovals, bars with rounded ends, lenticular forms, stretched polygons, lines or other geometric shapes. Due to the shape of the feed spacing features and the fact that the fluid must traverse around the outside of the feed spacing features, the fluid flow velocity will change locally in the areas between the feed spacing features, but if the feed spacing features are uniform in size and pattern, the bulk fluid velocity is only affected by the reduction in fluid volume caused by filtrate flowing through the membrane. The result is a net reduction in fluid volume and therefore fluid velocity from the inlet to the reject stream of the element.

In embodiments of the present invention, the feed spacing features vary in size, number, or shape along the fluid path of the feed/concentrate flow in the element, allowing the average flow velocity to be changed from one region to the next. The feed spacing features take up a portion of the cross-sectional area through which the water flows, and by changing this cross-sectional area, the bulk flow velocity can be changed independently of the velocity change caused by filtrate passing through the element. For example, the feed spacing features can increase in size, while maintaining constant height, from the feed inlet to the reject end of the element such that their cross-sectional area in the flow path increases in a manner proportional to the volume of water passing through the membrane to the filtrate stream such that the fluid flow velocity remains constant throughout the length of the fluid flow through the element.

In fluid separation systems and elements, the percentage of permeate removed from the feed solution is called the recovery, and this value varies from system to system and element to element depending on the application. System recoveries can be quite high, approaching 100% for zero liquid discharge systems for example. In cross flow filtration, however, individual element recovery is typically significantly lower. In some reverse osmosis water filtration applications, recoveries as high as 50% or higher are achieved. Many reverse osmosis water filtration elements, for example, specify maximum per element recovery at lower values such as 20% and in practice elements can produce even lower recovery per element, for example in the 10-15% range. The limits on the recovery generally are set by the level of fluid concentration where remaining materials in the cross-flow become problematic. When these concentrations become high enough, issues such as precipitation and scale formation, gel-layer formation, caking, or high osmotic pressures hinder the filtration process. Also, as flow velocities decrease, mixing and diffusion characteristics within the element change, which generally has detrimental effects on membrane flux. These issues are often exacerbated by the fact that fluid flow in the feed stream slows as permeate is removed even as the concentrations increase.

By varying the geometry of the feed spacing features in such a way as to change the average flow velocity, some of the detrimental effects of concentration changes can be countered. For example, in an element which is operating at 15% recovery if the number, size, or shape of the feed spacing features are increased such that at they take up 15% more of the feed space at the exit of the element, the average cross-flow velocity can be kept approximately constant throughout the element. If the spacing features are varied to take up more of the feed space, an element can be created in which the average flow velocity within the feed space actually increases across the element. One negative of increasing the number, size, or shape of the feed spacing features is that they will occlude a portion of the membrane surface, thus reducing the active surface area of the membrane sheet. The advantages provided by the altered flow characteristics in many cases will still produce better element performance in terms of membrane flux, total permeate flow, or reduced fouling or scaling, than a conventional element with a fixed feed spacer. The ability to manufacture filtration elements in which the internal flow can be customized to optimize performance in a specific application is also advantageous.

FIG. 1 is a schematic illustration of a conventional spiral wound membrane element prior to rolling, showing important elements of a conventional spiral wound membrane element 100. Permeate collection tube 12 has holes 14 in collection tube 12 where permeate fluid is collected from permeate carrier 22. In fabrication, membrane sheet 36 is a single continuous sheet that is folded at center line 30, comprised of a non-active porous support layer on one face 28, for example polysulfone, and an active polymer membrane layer on the other face 24 bonded or cast on to the support layer. In the assembled element, active polymer membrane surface 24 is adjacent to feed spacer mesh 26, and non-active support layer 28 is adjacent to permeate carrier 22. Feed solution 16 enters between active polymer membrane surfaces 24 and flows through the open spaces in feed spacer mesh 26. As feed solution 16 flows through feed spacer mesh 26, particles, ions, or chemical species, which are excluded by the membrane are rejected at active polymer membrane surfaces 24, and molecules of permeate fluid, for instance water molecules, pass through active polymer membrane surfaces 24 and enter porous permeate carrier 22. As feed solution 16 passes along active polymer membrane surface 24, the concentration of materials excluded by the membrane increases due to the loss of permeate fluid in bulk feed solution 16, and this concentrated fluid exits the reject end of active polymer membrane sheet 24 as reject solution 18. Permeate fluid in permeate carrier 22 flows from distal end 34 of permeate carrier 22 in the direction of center tube 12 where the permeate fluid enters center tube 12 through center tube entrance holes 14 and exits center tube 12 as permeate solution 20. To avoid contamination of the permeate fluid with feed solution 16, non-active polymer membrane layers 28 are sealed with adhesive along adhesive line 32 through permeate carrier 22 thereby creating a sealed membrane envelope where the only exit path for permeate solution 20 is through center tube 12. Typically, the width of the adhesive line 32 is 1-3" after the adhesive has been compressed during the rolling process.

Figure 2:
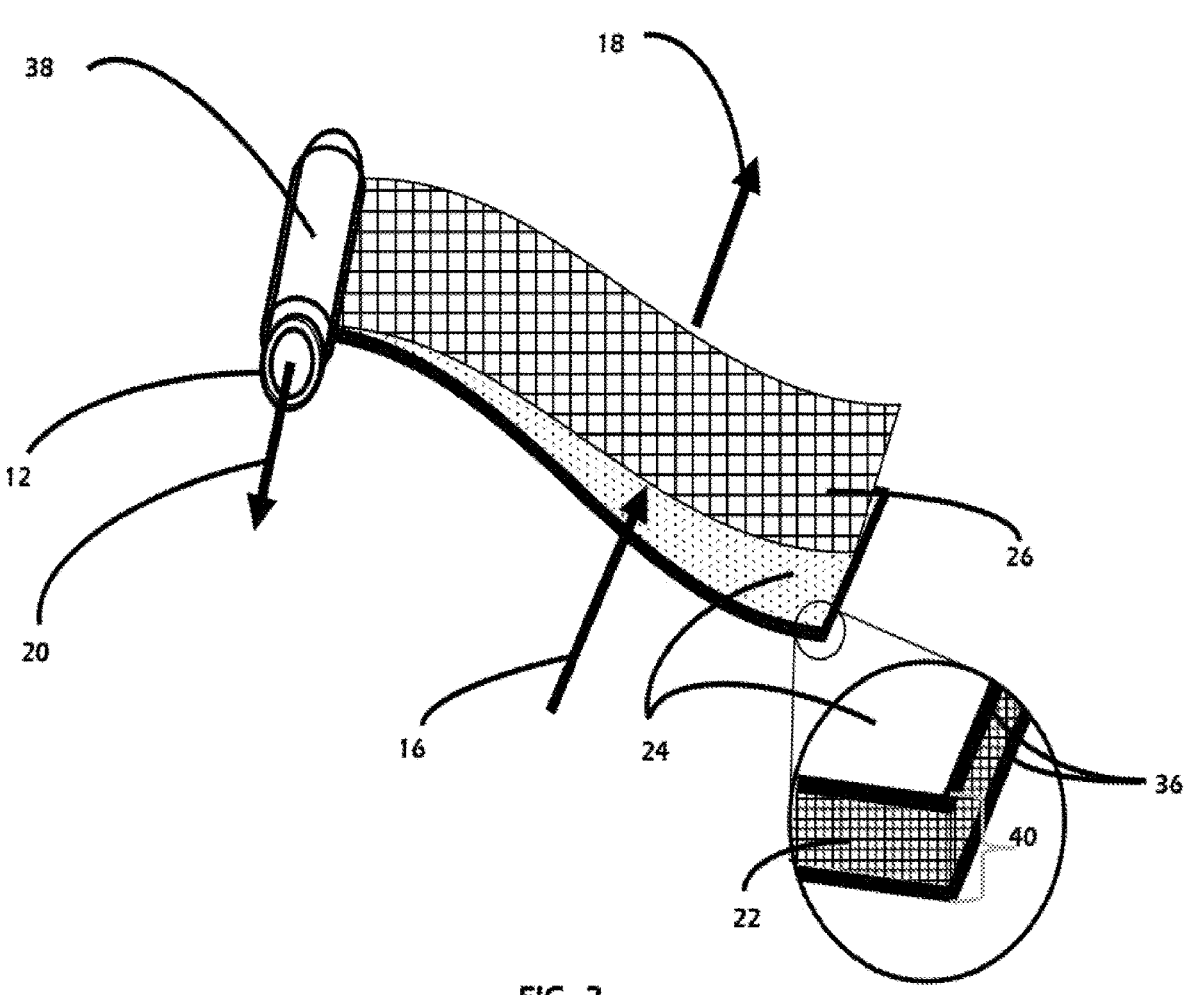
FIG. 2 is an exploded view of a partially assembled spiral wound membrane element.

A partially assembled spiral wound membrane element 200 is shown in FIG. 2. A membrane envelope 40 comprises, as described in connection with FIG. 1, a membrane sheet 36 folded at one end with a permeate carrier 22 disposed between the folds of the membrane sheet and sealed along the edges with a suitable adhesive. The boundary of the membrane sheet next to the collection tube can be referred to as an "end", as can the boundary opposite that end. The other two boundaries of the membrane sheet can be referred to as the "edges." In the conventional design of membrane element once rolled, a feed spacer mesh 26 is placed adjacent to envelope 40 to allow the flow of feed fluid 16 to flow between layers membrane envelope 40 and expose all of the active polymer surfaces 24 of the membrane sheet to feed fluid. Permeate, or product fluid, is collected in the permeate carrier 22 inside membrane envelope 40 and proceeds spirally down to center tube 12 where the product, or permeate fluid is collected while the reject stream 18 exits the element. A single spiral wound element can comprise a single membrane envelope and feed spacer layer, or can comprise multiple membrane envelopes and feed spacer layers stacked and rolled together to form the element.

Figure 3:
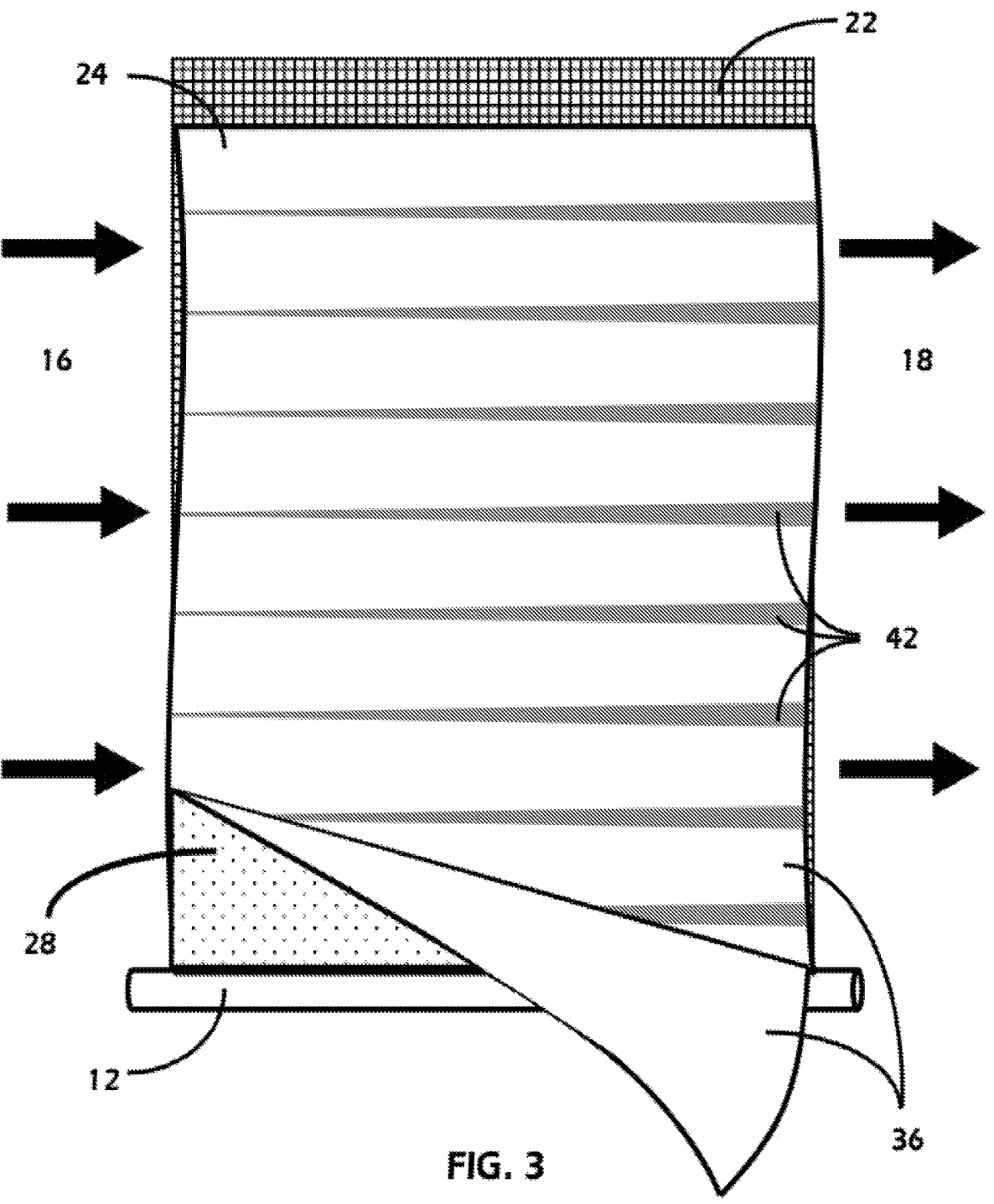
FIG. 3 is a view of a spiral-wound element before rolling with a printed flow control spacer which increases uniformly in width from the feed inlet to the concentrate outlet, occluding about 20% of the cross-flow area at the outlet.

An example embodiment of the present invention is depicted in FIG. 3, a single unrolled leaf of a spiral-wound element where the membrane envelope extends from the center tube 12. On one half of the active surface 24 of the membrane envelope are printed or deposited a series of spacer features 42 which are of a fixed height, but which increase in width continuously from the feed inlet 16 to the concentrate outlet 18. Since the spacer height is fixed, the increase in spacer width gradually reduces the cross-sectional area through which fluid flows. Because of the reduction in cross-sectional area, even as permeate is removed from the feed flow stream through the membrane surface, the average flow velocity remains more consistent. In the case of FIG. 3, the spacer features 42 occlude about 4% of the cross-sectional area at the feed inlet and about 24% of the cross-sectional area at the concentrate outlet. A spiral-wound membrane module employing this configuration and operated at 20% recovery will maintain approximately consistent average cross-flow velocity throughout the element.

Figure 4:
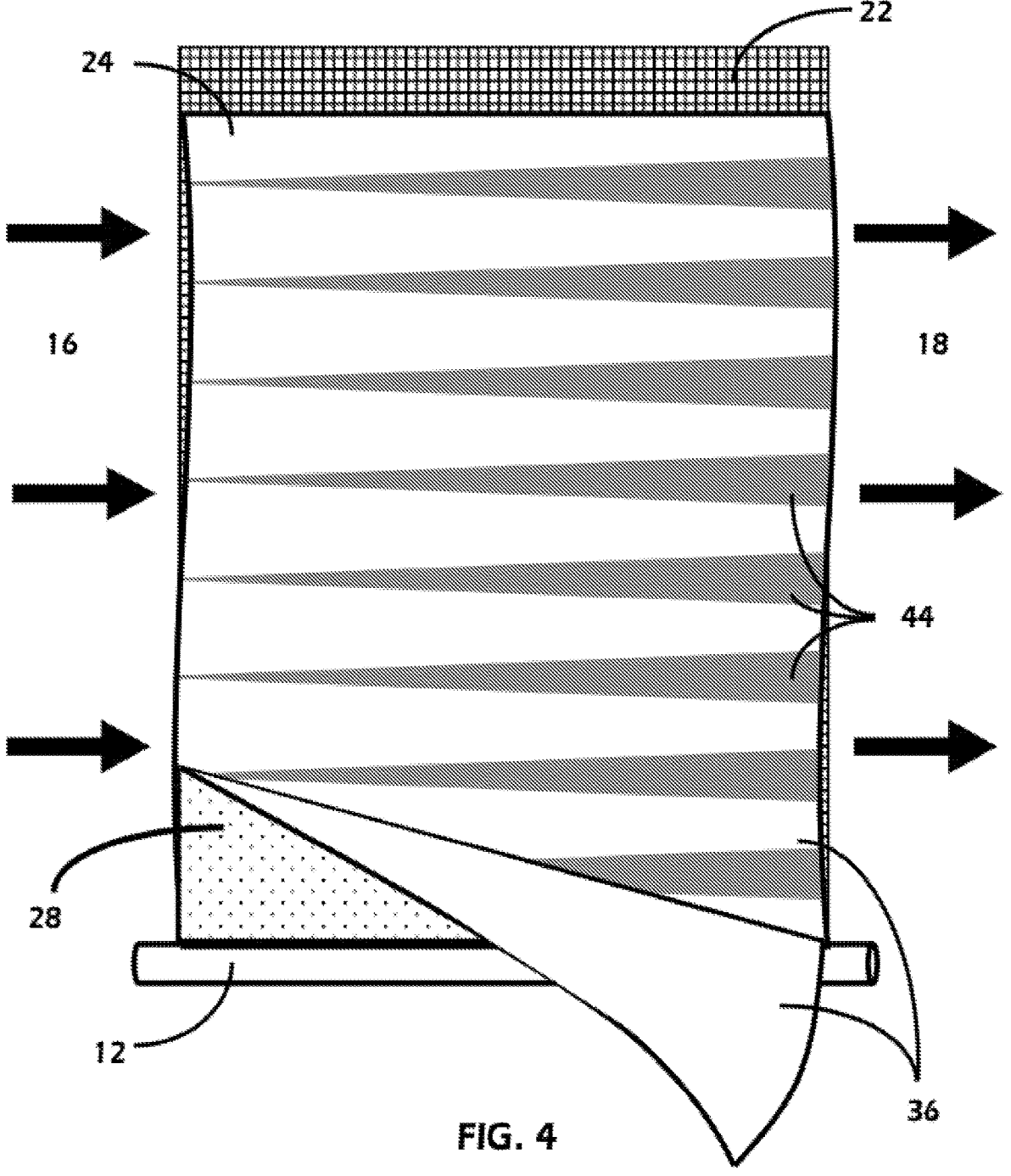
FIG. 4 is a view of a spiral-wound element before rolling with a printed flow control spacer which increases uniformly in width from the feed inlet to the concentrate outlet, occluding approximately 50% of the cross-flow area at the outlet.

FIG. 4 portrays an example embodiment in which a single unrolled leaf of a spiral wound element employs spacer features 44 printed or deposited on the active surface 24 of the membrane envelope which increase in width continuously from the feed inlet 16 to the concentrate outlet 18, but in this case the spacer takes up a much larger portion, 50%, of the cross-sectional area at the outlet. Such a configuration will provide uniform average flow velocity in an element at 50% recovery. At lower recovery the cross-flow velocity will increase from feed to concentrate, while at higher recovery the cross-flow velocity would decrease, although it would not decrease as much as it would in an element with a uniform feed spacer.

Figure 5:
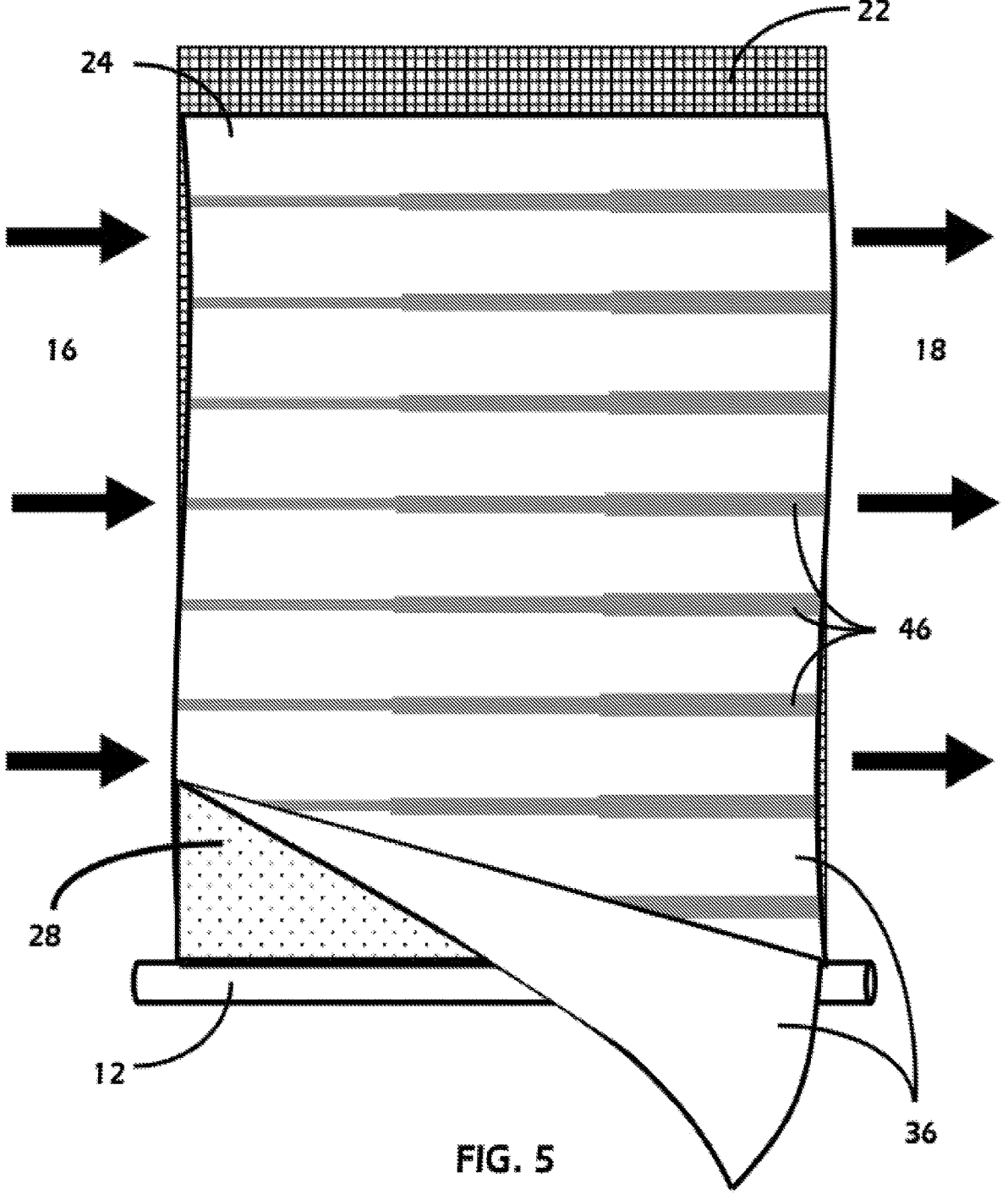
FIG. 5 is a view of a spiral-wound element before rolling with a printed flow control spacer which increases in a stepwise manner in width from the feed inlet to the concentrate outlet, occluding approximately 20% of the cross-flow area at the outlet.

An example embodiment illustrated in FIG. 5 shows a variation where the feed spacer features 46 increase in width in a stepwise manner from the feed inlet 16 to the concentrate outlet 18, rather than increasing uniformly. The figure depicts three distinct widths, but in the same manner any number of different distinct widths can be employed to reduce the cross-sectional flow area in discrete increments.

Figure 6:
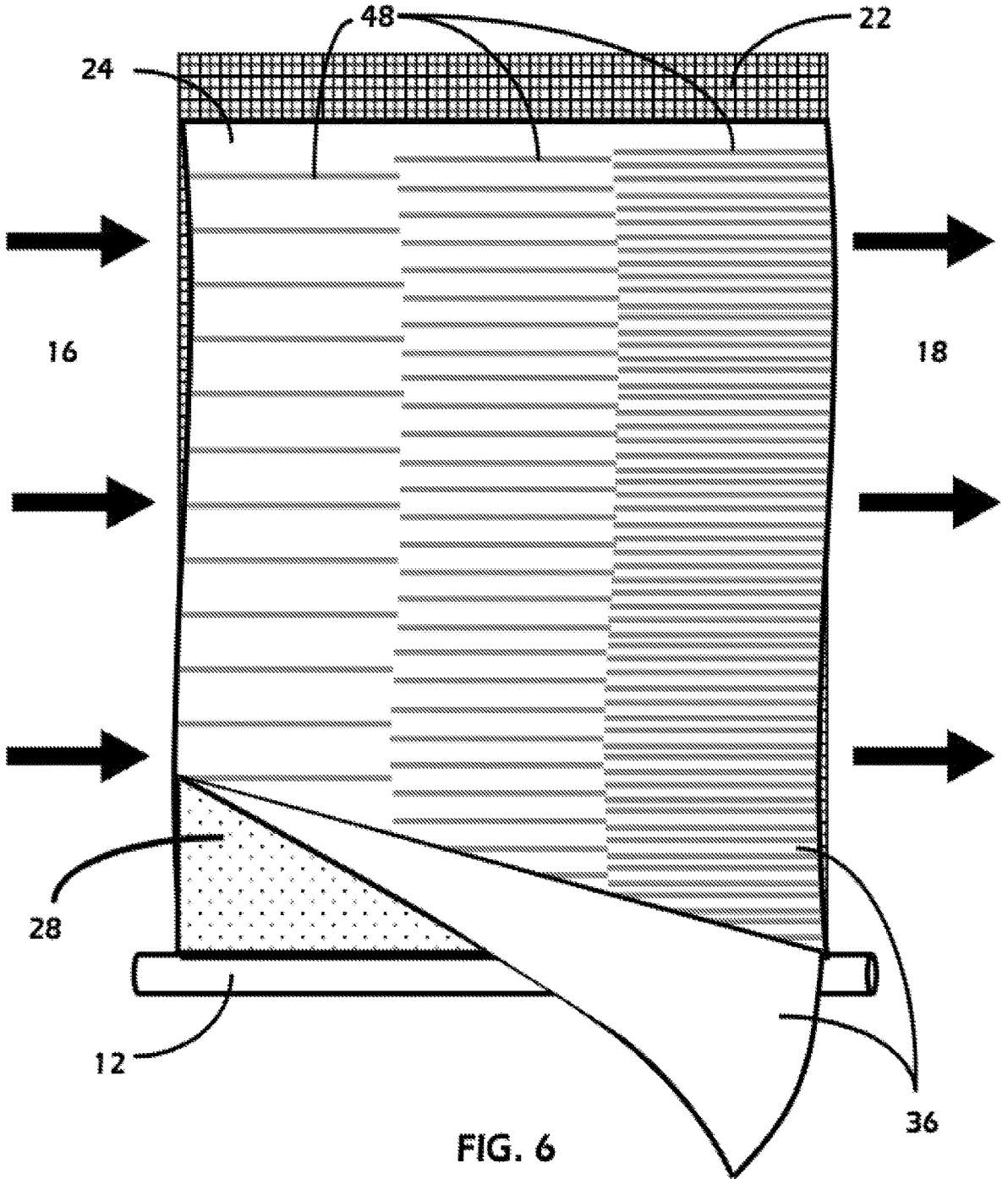
FIG. 6 is a view of a spiral-wound element before rolling with a printed flow control spacer consisting of lines which increase in number from the feed inlet to the concentrate outlet.

In other example embodiments, the area of the spacer features is increased by increasing the number of features from the inlet to the outlet rather than by changing feature shape. An example embodiment shown in FIG. 6 depicts an initially smaller number of spacer features 48 printed or deposited on the active surface 24 of the membrane envelope near the feed inlet 16. The number of spacer features 48 doubles in the center section, and doubles again near the concentrate outlet 18. Increasing the number of features in such a manner reduces the cross-flow area from inlet to outlet. Although in this depiction the area reduction is exponential, not linear, the principle of increasing the number of features can be linear or follow any other formula to increase or decrease the average cross-sectional area accordingly. In addition to line segments, other shapes such as rounds, ovals, polygons, teardrops, or other complex shapes can be employed in a similar fashion, changing in number from inlet to the outlet in order to tailor the flow within various regions of the element.

Figure 7:
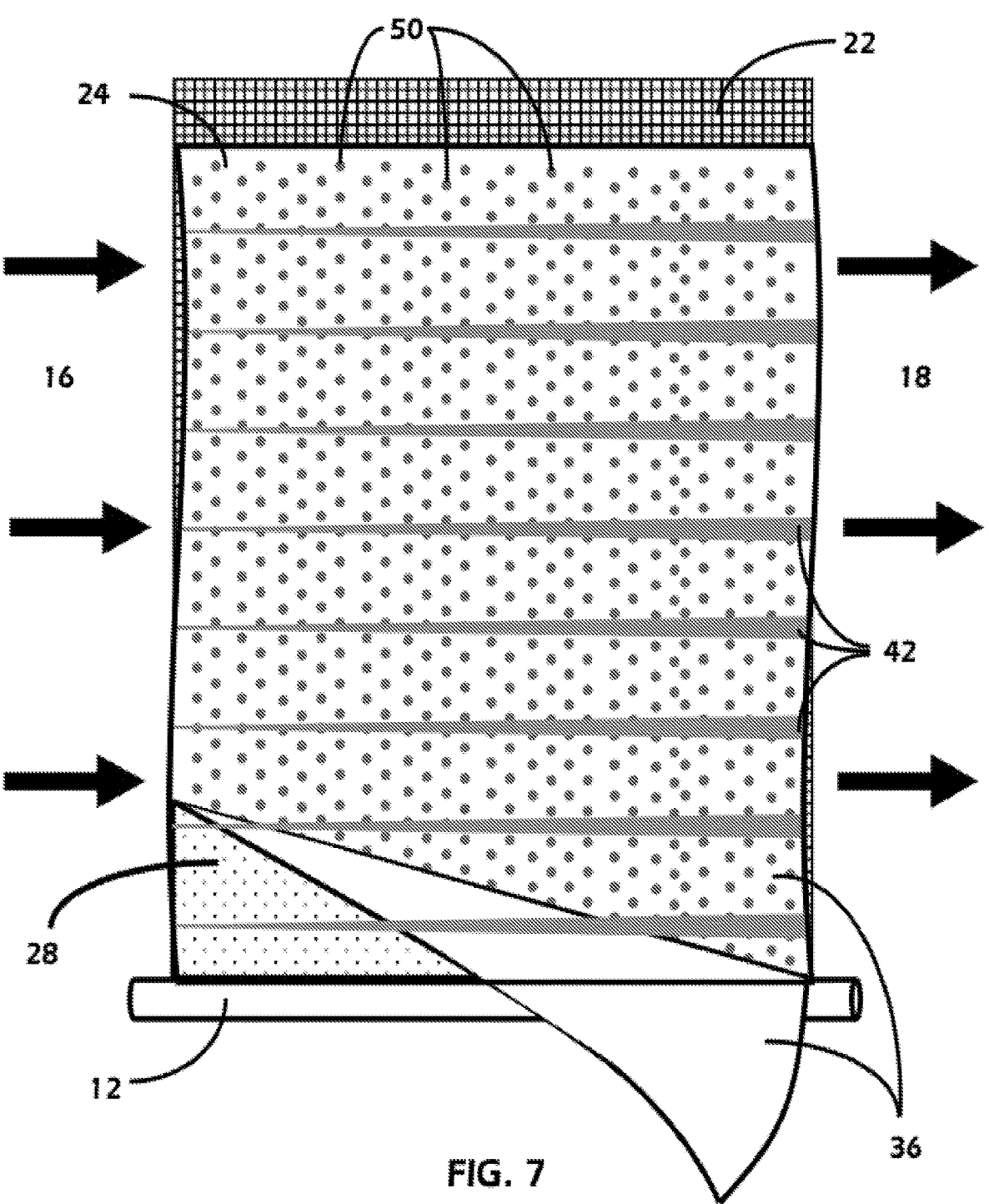
FIG. 7 is a view of a spiral-wound element before rolling with a printed flow control spacer which increases uniformly in width from the feed inlet to the concentrate outlet which also contains uniformly distributed feed spacer features.

Feed spacing features which vary in size, shape, or number to change the cross-sectional flow area can be combined with additional uniformly distributed feed spacing features printed or deposited on the active surface 24 of the membrane envelope 40 if such features are necessary to maintain the height of the flow channel. An embodiment depicted in FIG. 7, shows an array of uniformly spaced round spacer features 50 which in conjunction with the spacing features which increase in width 42 from the feed inlet 16 to the concentrate outlet 18.

Figure 8:
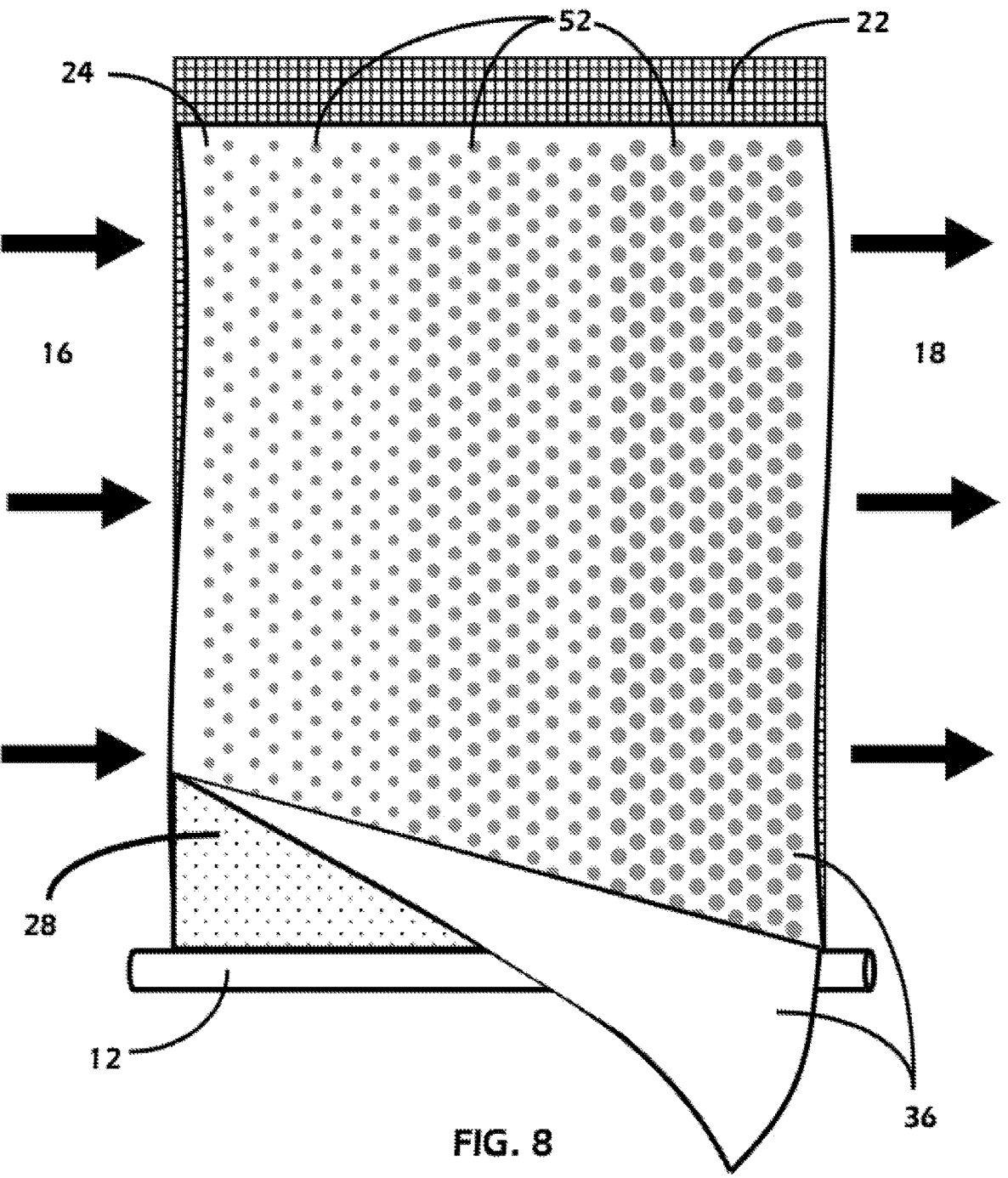
FIG. 8 is a view of a spiral-wound element before rolling with an array of printed flow control spacers comprising an array of round spacing features which increase in size from the feed inlet to the concentrate outlet.

While FIGS. 3-5 depict spacing features, which are continuous from the inlet to the outlet of the element, discrete arrays of features can also be employed to maintain the feed space, while changing in size in order to change flow characteristics within the feed/concentrate flow channel. An example embodiment in FIG. 8 has an array of round features 52 printed or deposited on the active surface 24 of the membrane envelope which increase in size from the feed inlet 16 to the concentrate outlet 18. In this illustration the size of the features increases in three distinct increments, but the size increase can occur in any number of increments, for example such that each successive row from the inlet to the outlet is larger than the previous row. In cases of discrete features, the local flow velocities vary as the fluid flows between the features and into the empty space in between them. The average cross-sectional area and therefore flow velocity, however, can still be manipulated by varying the feature size as described. In this illustration the size of the features 52 increases in three distinct increments, but the size increase can occur in any number of increments, for example from as low as two increments, to as many as an implementation in which each successive row is larger than the previous row.

Figure 9:
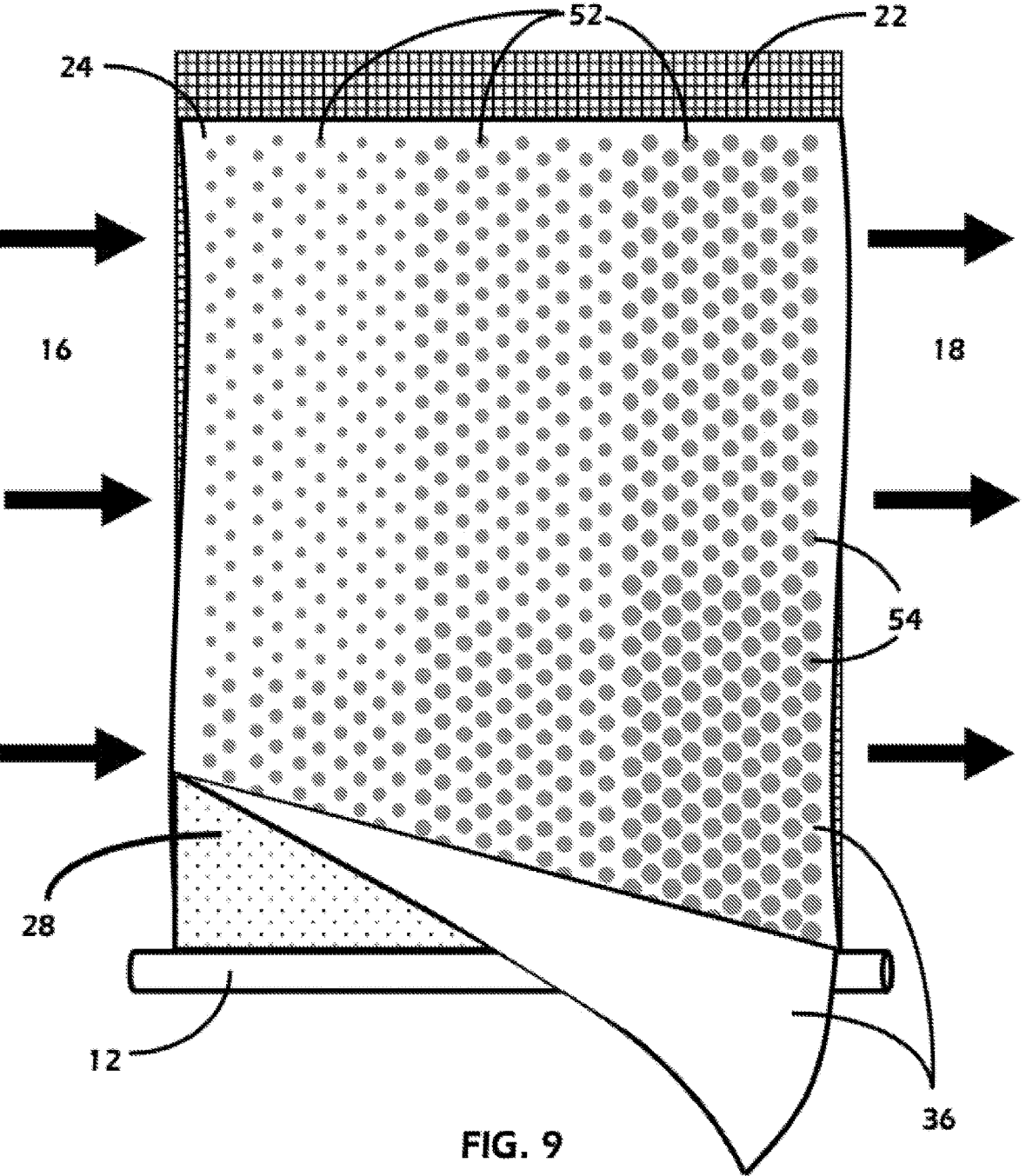
FIG. 9 is a view of a spiral-wound element before rolling with an array of printed flow control spacers comprising an array of round spacing features which increase in size from the feed inlet to the concentrate outlet, and also increase in size from the distal end to the center tube.

Back pressure within the porous permeate carrier 22 can also have an effect on the local permeation within the membrane envelope in some applications. In such situations typically, the flux through the membrane sheet will be higher near the center tube 12 since the distance for the permeate to travel, and thus the resistance to flow within the permeate carrier, is lowest in this location. It is common for scale buildup to occur in reverse osmosis membrane elements in the corner at the distal end of the element from the feed inlet 16 and closest to the center tube 12. This occurs because the distal end of the element from the feed, towards the concentrate outlet 18, contains fluid with the highest concentration and lowest velocity, and near the center tube because this region has a higher flux when compared to regions further from the center tube. In such cases it can be advantageous to increase the cross-flow velocity not only along the direction of feed to concentrate flow, but also to have a higher velocity nearer the central collection tube. An example embodiment of this configuration is shown in FIG. 9, which contains both round spacing features increasing in size 52 from the feed inlet 16 to the concentrate outlet 18, and also spacing features 54 increasing in size nearer the center tube 12. In this illustration the size of the features 52 increases in three distinct increments while the features 54 increase in two distinct increments, but the size increase can occur in any number of increments, for example from as low as two increments, to as many as an implementation in which each successive row in each dimension is larger than the previous row.

In most applications, the average reduction in cross-sectional area correlates to the desired recovery of the element in use, thus keeping the average flow velocity constant as the fluid flows through the element, for example, an element designed for operation at 15% recovery would have average cross-sectional flow area reduced linearly by 15% from inlet to outlet. Other applications can employ spacer gradations designed so that the flow velocity changes linearly, but not in direct correlation with recovery, such that the flow at the outlet of the element is, for example, 10% faster or only 5% slower than the feed inlet, where these changes in flow velocity are beneficial to element performance. In other embodiments, the change in cross-sectional area can be non-linear as it progresses in either dimension, for example the cross-sectional area can remain near constant through three-quarters of the length of the element, and then increase linearly or even exponentially from there to the end of the element. The use of varying the coverage area of the spacer features can also be used in conjunction with varying the height of the features at the same time in order to obtain additional control over cross sectional area and flow velocity within the feed channel.

The present invention has been described in connection with various example embodiments. It will be understood that the above description is merely illustrative of the applications of the principles of the present invention, the scope of which is to be determined by the claims viewed in light of the specification. Other variants and modifications of the invention will be apparent to those skilled in the art.

What is claimed is:

1. A membrane sheet for use in a laminated composition, wherein the membrane sheet has an active surface configured to provide selective fluid separation, wherein the membrane sheet has feed spacing features disposed thereon, wherein a portion of the membrane occupied by the feed spacing features varies from a first end of the membrane sheet to an opposite end of the membrane sheet, from a first edge of the membrane sheet to a second edge of the membrane sheet, or both;

wherein each feed spacing feature extends from near the first edge of the membrane sheet to near the second edge of the membrane sheet, and has a width that is greater near the first edge of the membrane sheet than near the second edge of the membrane sheet.

2. The membrane sheet of claim 1, wherein the feed spacing features are separated by a distance measured parallel to the first edge, where the distance is greater in a region near the first end of the membrane sheet than in a region near the second end of the membrane sheet.

3. The membrane sheet of claim 1, further comprising:

(a) a permeate carrier;

(b) wherein the membrane sheet is disposed such that the surface of the membrane sheet opposite the active surface is in contact with the permeate carrier, the membrane sheet and the permeate carrier together forming a laminated composition.

4. A spiral wound element, comprising a collection tube and a laminated composition as in claim 3, spirally wound around the collection tube such that the permeate carrier is in fluid communication with the collection tube.

5. A method of treating water, comprising providing a spiral wound element as in claim 4, supplying feed water to the spiral wound element such that feed water is in contact with the active surface of the membrane sheet, and collecting treated water from the collection tube.

* * * * *